(12) United States Patent
Otsuka et al.

(10) Patent No.: US 8,596,095 B2
(45) Date of Patent: Dec. 3, 2013

(54) MANUFACTURE OF SYNTHETIC QUARTZ GLASS INGOT AND SYNTHETIC QUARTZ GLASS MEMBER

(75) Inventors: Hisatoshi Otsuka, Joetsu (JP); Kazuo Shirota, Joetsu (JP); Osamu Sekizawa, Joetsu (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 605 days.

(21) Appl. No.: 11/896,873

(22) Filed: Sep. 6, 2007

(65) Prior Publication Data

US 2008/0115533 A1    May 22, 2008

(30) Foreign Application Priority Data

Sep. 7, 2006    (JP) .................................. 2006-242555

(51) Int. Cl.
*C03B 37/018*    (2006.01)
(52) U.S. Cl.
USPC .............................................. 65/416; 65/413
(58) Field of Classification Search
USPC .................... 65/17.3–17.6, 413–416
See application file for complete search history.

(56) References Cited

U.S. PATENT DOCUMENTS

| | | | |
|---|---|---|---|
| 6,018,964 A | 2/2000 | Yajima et al. | |
| 6,189,339 B1 * | 2/2001 | Hiraiwa | ........................ 65/17.3 |
| 6,319,634 B1 | 11/2001 | Berkey et al. | |
| 7,232,778 B2 | 6/2007 | Otsuka et al. | |
| 2003/0126889 A1 | 7/2003 | Otsuka et al. | |
| 2003/0138587 A1 | 7/2003 | Otsuka et al. | |
| 2004/0007025 A1 * | 1/2004 | Gotoh et al. | ................... 65/384 |
| 2005/0132749 A1 | 6/2005 | Otsuka et al. | |

FOREIGN PATENT DOCUMENTS

| | | | | |
|---|---|---|---|---|
| EP | 1 209 129 A2 | 5/2002 | | |
| EP | 1 329 429 | 7/2007 | | |
| JP | 7-138028 A | 5/1995 | | |
| JP | 10067521 A | * 3/1998 | ............... | C03B 8/04 |
| JP | 10338531 A | * 12/1998 | ............... | C08B 8/04 |
| JP | 2003-176142 A | 6/2003 | | |

* cited by examiner

Primary Examiner — Jodi C Franklin

(74) Attorney, Agent, or Firm — Birch, Stewart, Kolasch & Birch, LLP

(57) ABSTRACT

A synthetic quartz glass ingot is prepared by vapor phase hydrolyzing or oxidatively decomposing a silica feedstock in a flame to form fine particles of silica, depositing the silica particles on a target and melting and vitrifying the particles to form a synthetic quartz glass ingot on the target while the target is moved back and forth. The method further comprises: (i) continuously feeding the silica feedstock at a predetermined rate, (ii) keeping the flame in constant contact with an overall growing face, (iii) cyclically repeating the back and forth movement of the target at a predetermined speed, and (iv) maintaining the shape of the growing ingot unchanged.

6 Claims, 1 Drawing Sheet

(1) FORWARD TRAVEL DISTANCE
(2) BACKWARD TRAVEL DISTANCE
(3) GROWTH DISTANCE (1) FORWARD TRAVEL DISTANCE
(2) BACKWARD TRAVEL DISTANCE
(3) GROWTH DISTANCE

MANUFACTURE OF SYNTHETIC QUARTZ GLASS INGOT AND SYNTHETIC QUARTZ GLASS MEMBER

CROSS-REFERENCE TO RELATED APPLICATION

This non-provisional application claims priority under 35 U.S.C. §119(a) on Patent Application No. 2006-242555 filed in Japan on Sep. 7, 2006, the entire contents of which are hereby incorporated by reference.

TECHNICAL FIELD

This invention relates to methods for the manufacture of synthetic quartz glass ingots and synthetic quartz glass members therefrom. The synthetic quartz glass members are used in the application where a high level of homogeneity is required, for example, as lenses, prisms, mirrors, and windows in the photolithography using excimer lasers, typically ArF excimer lasers, synthetic quartz glass substrates for photomasks in the semiconductor, and especially recently as synthetic quartz glass substrates for large-sized photomasks in the LCD field.

BACKGROUND ART

The drive toward higher levels of integration in VLSI circuits has led to a need for submicron-scale exposure technology in the photolithographic systems used to form integrated circuit patterns on wafers. Light sources of increasingly shorter wavelength are being employed in exposure systems to carry out patterning to smaller linewidths. The i-line (wavelength, 365 nm), once the light source of choice in lithography steppers, has been largely supplanted by the KrF excimer laser (248 nm), and today ArF excimer lasers (193 nm) are starting to see industrial use.

In the liquid crystal display (LCD) field, large-sized synthetic quartz glass substrates are currently employed as photomasks while they require image writing feature sizes of the order of several generations ago, as referred to in the semiconductor technology. From now on, the image writing feature size will decline in a direction following the technical transitions in the semiconductor technology. It is expected that large-sized photomask substrates for LCD will be required to have a quality approximate to that of the semiconductor photomask substrates.

Synthetic quartz glass is generally prepared by several processes so as to avoid contamination of metal impurities which cause UV absorption. One exemplary process, which is commonly known as "direct process," is by introducing a vapor of a high purity silicon compound such as silicon tetrachloride directly into an oxyhydrogen flame, subjecting the compound to flame hydrolysis to form fine particles of silica, depositing the silica particles directly on a rotating heat resistant substrate of quartz glass or the like, and concurrently melting and vitrifying the particles to form synthetic quartz glass ingot. Another process, which is commonly known as "soot process," is by depositing and sintering soot on a heat resistant substrate and then vitrifying the deposit into transparent glass in an electric furnace or the like. In either way, transparent synthetic quartz glass members are produced.

Synthetic quartz glass products thus prepared have satisfactory light transmission even in the short wavelength region down to about 190 nm. They are thus widely employed as transmissive materials for UV radiation including i-line, excimer lasers such as KrF (248 nm), XeCl (308 nm), XeBr (282 nm), XeF (351, 353 nm) and ArF (193 nm), the 4-fold harmonic of YAG (250 nm), and the like.

From the synthetic quartz glass ingots prepared by the above-mentioned processes, synthetic quartz glass substrates are produced, for example, by hot shaping the ingot into a quartz block of the desired shape, annealing for removing thermal strain, slicing the block into plates, and polishing. The resulting synthetic quartz glass substrates are ready for use as semiconductor photomask substrates.

Recently, synthetic quartz glass ingots by the direct process are often used in the production of large-sized synthetic quartz glass substrates for LC photomasks which are used in the LCD manufacture process.

However, large-sized photomask substrates for LC use are increasing in size with the advancing generation of LCD. The current photomask substrates have dimensions of 1,220 mm×1,400 mm at maximum. In preparing stocks for such large-sized substrates, the soot process may be used which includes vapor-phase axial deposition (VAD) and outside vapor deposition (OVD) processes. Of these, the VAD process can produce only synthetic quartz glass ingots of light weight and is difficult to produce large-sized substrates. The OVD process can produce synthetic quartz glass tubes of heavy weight, which can be processed into plates by the technique disclosed in U.S. Pat. No. 6,319,634. However, the overall process has the drawbacks that a number of steps are involved and fine bubbles resulting from unmelted soot residues can be left in the glass.

Thus, in the prior art, synthetic quartz glass ingots are formed by the direct process in a thick and long form so as to provide a weight gain, thus obtaining stocks for large-sized substrates. However, when the diameter of an ingot is increased above a certain level, it becomes difficult to maintain the shape of the ingot growing face unchanged. For example, if an ingot has a diameter as large as 200 mm, the shape of the growing face is distorted and becomes irregular, interfering with continuous growth. Then the supply of silicon compound feedstock is interrupted at predetermined intervals, the irregular surface resulting from distortion of the growing face is corrected solely by an oxyhydrogen flame. See U.S. Pat. No. 7,232,778 or EP-A 1329429 corresponding to JP-A 2003-176142. In this case, striae are formed in a plane perpendicular to the ingot growth direction. Although the striae are observable in a perpendicular direction to the synthetic quartz glass ingot growing direction, the ingot is shaped in a direction parallel to the ingot growth direction and the surface of the shaped member serving as a substrate has the same direction so that no striae are inspected. However, as the substrate size becomes larger, striae are sometimes observed near the periphery of substrates. It is believed that since the spacing between striae is narrow at a curved peripheral portion of a growing synthetic quartz glass ingot, such closely packed striae become visible. It is forecast that these striae will give rise to optical problems when a finer feature size becomes necessary in the LC field.

DISCLOSURE OF THE INVENTION

An object of the present invention is to provide a method for the manufacture of synthetic quartz glass ingots so that synthetic quartz glass members having a high level of optical homogeneity and few striae are readily produced therefrom; and to provide a method for the manufacture of synthetic quartz glass members from the ingots, which members are used as synthetic quartz glass substrates for photomasks and especially synthetic quartz glass substrates for large-sized photomasks in the LCD field.

The invention addresses a method for preparing a synthetic quartz glass ingot by a direct process, comprising vapor phase hydrolyzing or oxidatively decomposing a silica feedstock in a burner flame to form fine particles of silica, depositing the silica particles on a target and concurrently melting and vitrifying the particles to form a synthetic quartz glass ingot on the target. The ingot is grown while the target is moved back and forth. The synthetic quartz glass ingot is improved in quality by adding the steps of (i) continuously feeding the silica feedstock at a predetermined rate, (ii) keeping the flame in constant contact with an overall growing face, (iii) cyclically repeating the back and forth movement of the target at a predetermined speed, and (iv) maintaining the shape of the growing ingot unchanged. Typically, the back and forth movement of the target has a cycle time of up to 10 minutes. When a plate-shaped synthetic quartz glass member is obtained from the synthetic quartz glass ingot prepared by the above method through shaping, annealing, slicing and polishing steps, no striae are observable in this member by optical inspection. The synthetic quartz glass member can have a striae visibility which corresponds to grade A of U.S. military specification MIL-G-174B.

Accordingly, the present invention in a first aspect provides a method for preparing a synthetic quartz glass ingot by a direct process, comprising vapor phase hydrolyzing or oxidatively decomposing a silica feedstock in a burner flame to form fine particles of silica, depositing the silica particles on a target and concurrently melting and vitrifying the particles to form and grow a synthetic quartz glass ingot on the target while the target is moved back and forth. The method further comprises the steps of (i) continuously feeding the silica feedstock at a predetermined rate, (ii) keeping the flame in constant contact with an overall growing face, (iii) cyclically repeating the back and forth movement of the target at a predetermined speed, and (iv) maintaining the shape of the growing ingot unchanged. In a preferred embodiment, the back and forth movement of the target has a cycle time of up to 10 minutes.

The present invention in a second aspect provides a method for manufacturing a synthetic quartz glass member, comprising the steps of shaping, annealing, slicing and polishing the synthetic quartz glass ingot prepared by the method of the first aspect, to form a plate-shaped synthetic quartz glass member in which no striae are observable by optical inspection. In a preferred embodiment, the synthetic quartz glass member has a striae visibility which corresponds to grade A of U.S. military specification MIL-G-174B.

BENEFITS OF THE INVENTION

According to the method of the invention, synthetic quartz glass ingots of quality are obtainable. Synthetic quartz glass members are manufactured therefrom which are suited for typical use as large-sized synthetic quartz glass substrates for large-sized photomasks in the LCD field.

DESCRIPTION OF THE PREFERRED EMBODIMENTS

Figure 1:
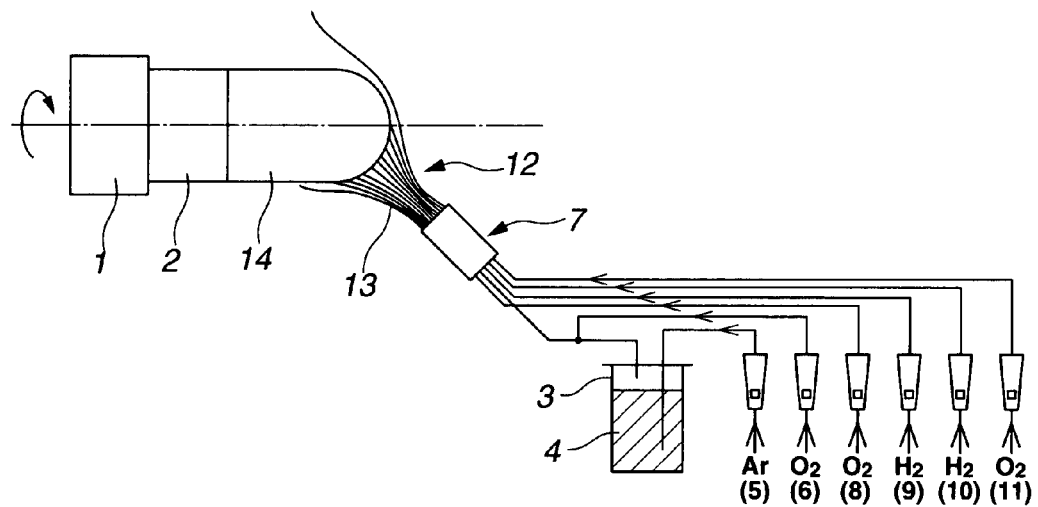
FIG. 1 is a schematic diagram showing an exemplary apparatus for producing a synthetic quartz glass ingot.
Figure 2:
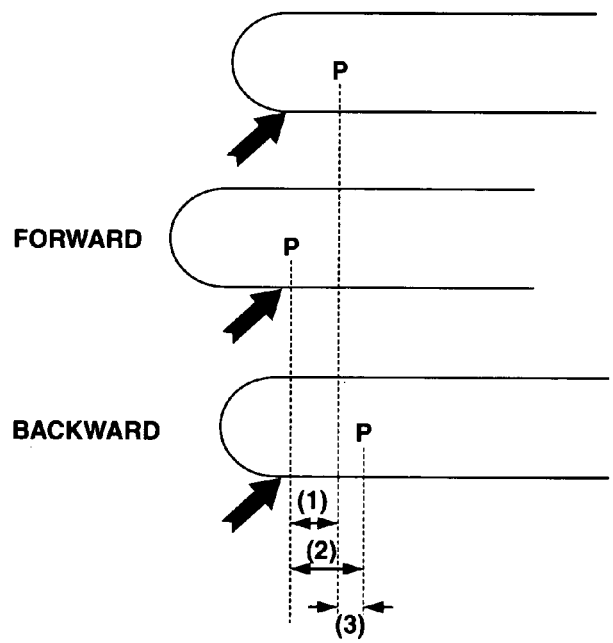
FIG. 2 schematically illustrates the back and forth movement of a synthetic quartz glass ingot.

According to the method of the invention, a synthetic quartz glass ingot is prepared by the direct process, that is, by vapor phase hydrolyzing or oxidatively decomposing a silica feedstock in a burner flame to form fine particles of silica, depositing the silica particles on a target and concurrently melting and vitrifying the particles to form a synthetic quartz glass ingot on the target. The ingot is grown while the target is moved back and forth. The method further comprises the steps of (i) continuously feeding the silica feedstock at a predetermined rate, (ii) keeping the flame in constant contact with an overall growing face, (iii) cyclically repeating the back and forth movement of the target at a predetermined speed, and (iv) maintaining the shape of the growing ingot unchanged.

Specifically, a synthetic quartz glass ingot is prepared from a silica feedstock by the direct process. Silica fine particles are deposited on a target to form or grow a synthetic quartz glass ingot. The target on which silica fine particles are deposited and melted or the synthetic quartz glass ingot growing on the target is moved back and forth in a horizontal or vertical direction. More specifically, a silica feedstock in vapor phase is continuously supplied at a predetermined rate to a flame, typically oxyhydrogen flame emerging from a burner where fine particles of silica are formed. The silica particles are deposited and melted on the target or on a synthetic quartz glass ingot growing thereon. The target or the growing synthetic quartz glass ingot is moved forward at a predetermined speed for a predetermined time, stopped for an instance and moved backward at the predetermined speed for the predetermined time. This back and forth movement, constituting one cycle, is cyclically repeated while the synthetic quartz glass ingot is grown.

While the target is moved back and forth, the growing face or front of the ingot is always covered by the oxyhydrogen flame. That is, the growing face of the ingot is not brought out of contact with the flame. If the ingot growing face is out of contact with the flame, the surface temperature of the growing face experiences an extreme drop. This allows unmelted silica particles to be left on the growing face, which become bubbles to interfere with sound ingot growth.

The cycle time of target movement is preferably equal to or less than 10 minutes, and more preferably equal to or less than 5 minutes, provided that one cycle consists of forward and backward travels. If the cycle time is more than 10 minutes, intense striae can generate in a plane perpendicular to the growth direction of the growing synthetic quartz glass ingot. For preparation of a synthetic quartz glass ingot, cyclic repetition of movement may be automated by a sequencer. Although no particular lower limit is imposed to the cycle time, it is usually at least 5 seconds.

The speed of back and forth movement is preferably at least 0.10 millimeter per second (mm/sec), and more preferably at least 0.20 mm/sec. If the moving speed is less than 0.10 mm/sec, the deposit on the ingot has a longer residence time during translational growth, tending to generate striae. It is also preferred from the standpoint of avoiding striae generation that the moving speed is selected such that the growth distance, which is the difference between backward and forward travel distances, is 0.1 to 5 mm, more preferably 0.1 to 2 mm. Although no particular upper limit is imposed to the moving speed, it is usually up to 10 mm/sec.

The back and forth movement of the target for the predetermined cycle time ensures that the synthetic quartz glass ingot has a diameter equal to or greater than 160 mm, and preferably equal to or greater than 190 mm. It is also recommended that the settings of the burner are adjusted at the growth starting stage so that the growing face always has a predetermined shape, and the feed rates of silane compound, combustible gas and combustion-supporting gas to the burner are adjusted to a good balance so that the shape of the growing face remains unchanged all the time. With respect to the diameter of the synthetic quartz glass ingot, a diameter around 190 mm is close to the limit below which the stable state where the shape of the growing face remains unchanged is maintained. If the burner settings, feedstock and oxyhydrogen gas feed rates and other parameters ensuring the stable state where the growing face shape remains unchanged are previously determined, then the diameter of an ingot that is grown under those conditions can be further increased by back and forth movement of the target. The growth rate of the ingot may be determined in the range of 5 to 30 mm/hr so that the ingot diameter and the ingot growing face shape are maintained constant.

The silica feedstock used herein comprises an organosilicon compound. Preferred examples include silane compounds of general formulae (1) and (2) and siloxane compounds of general formulae (3) and (4) below.

$$R_nSiX_{4-n} \quad (1)$$

Herein, R is hydrogen or an aliphatic monovalent hydrocarbon group, X is a halogen atom or alkoxy group, and n is an integer of 0 to 4.

$$(R^1)_nSi(OR^2)_{4-n} \quad (2)$$

Herein, $R^1$ and $R^2$ are each independently an aliphatic monovalent hydrocarbon group, and n is an integer of 0 to 3.

Herein, $R^3$ is hydrogen or an aliphatic monovalent hydrocarbon group, m is an integer of at least 1, especially equal to 1 or 2, and p is an integer of 3 to 5.

Illustrative examples of the aliphatic monovalent hydrocarbon groups represented by R, $R^1$, $R^2$ and $R^3$ include $C_{1-4}$ alkyl groups such as methyl, ethyl, propyl, n-butyl and tert-butyl; $C_{3-6}$ cycloalkyl groups such as cyclohexyl; and $C_{2-4}$ alkenyl groups such as vinyl and allyl.

Examples of suitable silane compounds of formula (1) include $SiCl_4$ and $CH_3SiCl_3$. Examples of suitable silane compounds of formula (2) include $Si(OCH_3)_4$, $Si(OCH_2CH_3)_4$ and $CH_3Si(OCH_3)_3$. Examples of suitable siloxane compounds of formula (3) or (4) include hexamethyldisiloxane, hexamethylcyclotrisiloxane, octamethylcyclotetrasiloxane and decamethylcyclopentasiloxane.

A quartz burner that forms the oxyhydrogen flame is supplied with the feedstock such as silane or siloxane compounds, a combustible gas such as hydrogen, carbon monoxide, methane or propane, and a combustion-supporting gas such as oxygen. As is usually the case, the burner which receives the silane compound, combustible gas (e.g., hydrogen), and combustion-supporting gas (e.g., oxygen) may be of the type in which the center portion has a concentric multitube construction, and particularly a three- or five-tube construction.

The apparatus used to produce the synthetic quartz glass ingot may have a vertical construction or a horizontal construction as shown in FIG. 1.

In a preferred embodiment, the silica feedstock is fed at a feed rate of 2,000 to 6,000 g/hr, especially 3,000 to 5,000 g/hr because this facilitates to maintain the shape of the ingot growing face unchanged. Also preferably the gas feeds are adjusted so that the flame has a temperature of 1,800° C. to 2,400° C., and more preferably 1,900° C. to 2,200° C.

The synthetic quartz glass ingot prepared in this way is used, for example, in the form of synthetic quartz glass members, typically as synthetic quartz glass substrates for large-sized photomask substrates in the LCD application.

Specifically, the synthetic quartz glass ingot prepared above is processed into a block, for example, a prism block of 800 mm×920 mm by repeating hot-shaping several times. The block is annealed, sliced, and ground to form a large-sized synthetic quartz glass substrate. By virtue of the back and forth movement involved in the preparation process, no striae are observed in the resulting synthetic quartz glass substrate when the ground surface is visually observed through a polarizer. Specifically, the synthetic quartz glass member has a striae visibility which corresponds to striae grade A of U.S. military specification MIL-G-174B.

The dimensions of a synthetic quartz glass ingot or a synthetic quartz glass prism block are not particularly limited. For example, the ingot may have dimensions: from a diameter of 160 mm and a length of 1,000 mm to a diameter of 260 mm and a length of 2,500 mm, and preferably from a diameter of 210 mm and a length of 2,000 mm to a diameter of 260 mm and a length of 2,500 mm. A prism block obtained therefrom may have dimensions: from 350 mm×500 mm×55 mm to 1,300 mm×1,450 mm×60 mm, and preferably from 900 mm×1,000 mm×55 mm to 1,300 mm×1,450 mm×60 mm.

The techniques and conditions of shaping, post-shaping annealing and grinding or polishing steps may be well-known techniques and conditions.

EXAMPLE

The following examples are provided to illustrate the invention, and are not intended to limit the scope thereof.

Notably, the visibility of striae is measured in accordance with U.S. military specification MIL-G-174B, using a Schlieren instrument.

Examples and Comparative Examples

A synthetic quartz glass ingot was produced by feeding methyltrichlorosilane as the feedstock to a quartz burner, subjecting the silane to oxidative or combustive decomposition in an oxyhydrogen flame to form fine particles of silica, and depositing the silica particles on a rotating quartz target while melting and vitrifying the silica particles at the same time.

As shown in FIG. 1, a quartz glass target 2 was mounted on a rotating support 1. Argon 5 was introduced into the silica feedstock (methyltrichlorosilane) 4 held in a feedstock vaporizer 3. Methyltrichlorosilane 4 vapor was carried out of the vaporizer by the argon 5, and oxygen 6 was added to the silane-laden argon to form a gas mixture, which was then fed to the center nozzle of a quartz burner 7. The burner 7 was also fed the following gases, in outward order from the foregoing gas mixture at the center: oxygen 8, hydrogen 9, hydrogen 10, and oxygen 11. The burner 7 ejected the feedstock, methyltrichlorosilane and an oxyhydrogen flame 12 toward the target 2. Fine particles of silica 13 were deposited on the target 2 and simultaneously melted and vitrified as clear glass, forming a synthetic quartz glass ingot 14. During the process, the target 2 was axially moved back and forth while it was rotated about its axis.

The feed rate of methyltrichlorosilane was 3,000 g/hr, and the flow rates of hydrogen and oxygen were 50 Nm$^3$/hr and 18 Nm$^3$/hr, respectively. Synthetic quartz glass was produced by the direct process, i.e., by supplying these feeds to a quartz burner, and depositing silica fine particles on a rotating heat resistant substrate and simultaneously melting and vitrifying the silica.

The flame temperature was 1,900° C. to 2,200° C. The overall growing face was constantly covered with this flame so that the shape of the growing ingot remained substantially unchanged, that is, the ingot maintained a fixed shape like cartridge.

Table 1 indicates the cycle time and speed of back and forth movement of the target along with the growing rate.

The synthetic quartz glass ingot thus produced had a diameter of 200 mm and a length of 2,000 mm. A block having a diameter of 200 mm and a length of 200 mm was cut out. The block was machined on their surface and cleaned, after which it was shaped to a diameter of 270 mm and a length of 105 mm by placing it in a vacuum melting furnace in an argon gas atmosphere at −266 hPa, heating to 1,750° C., and holding for 1 hour. The shaped block was shaped again under the same conditions into a block of 330 mm×450 mm×40 mm.

The shaped block was annealed in an ambient atmosphere by heating to 1,150° C., holding at the temperature for 10 hours, and then slowly cooling at a rate equal to or less than 0.1° C./min to 600° C.

The synthetic quartz glass block thus obtained was sliced to a thickness of 10 mm and polished on the surfaces. The surface of 330 mm×450 mm was inspected for striae by means of a Schlieren instrument, detecting no striae. It was also inspected by an interferometer Zygo Mark IV (Zygo Corp.), detecting no striae.

Synthetic quartz glass ingots of Examples and Comparative Examples were prepared under the conditions shown in Table 1 and processed into plates, which were found to have a striae visibility as reported in Table 1.

TABLE 1

| | Cycle time (min) | Travel distance per cycle (mm) | | Moving speed (mm/sec) | Growth rate (mm/hr) | Striae visibility (MIL-G-174B) |
|---|---|---|---|---|---|---|
| | | Forward | Backward | | | |
| Example 1 | 3 | 35.2 | 35.5 | 0.39 | 8.0 | A |
| Example 2 | 10 | 36.0 | 37.2 | 0.12 | 8.4 | A |
| Comparative Example 1 | 12 | 38.0 | 39.8 | 0.09 | 9.0 | B |
| Comparative Example 2 | 53 | 28.4 | 38.5 | 0.02 | 11.0 | C |

Japanese Patent Application No. 2006-242555 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for preparing a synthetic quartz glass ingot by a direct process, comprising vapor phase hydrolyzing or oxidatively decomposing a silane compound or a siloxane compound in a burner flame to form fine particles of silica, depositing the silica particles on a target and concurrently melting and vitrifying the particles to form and grow a synthetic quartz glass ingot on the target while the target is moved back and forth, said method further comprising the steps of:
(i) continuously feeding the silane compound or the siloxane compound at a predetermined rate,
(ii) keeping the flame in constant contact with an overall front of the ingot,
(iii) repeating the back and forth movement of the target in an axial direction along an ingot growth direction, wherein a difference between backward and forward travel distance is 0.1 to 5 mm, so that the back and forth movement of the target has a cycle time of up to 10 minutes and is repeating at a predetermined speed of 0.10 to 0.39 mm/sec, and
(iv) maintaining a face shape of the growing ingot unchanged by adjusting the feed rate of the silane compound or the siloxane compound and controlling an ingot growth rate to 5 to 30 mm/hr.

2. A method for manufacturing a synthetic quartz glass member, comprising the steps of shaping, annealing; slicing and polishing the synthetic quartz glass ingot prepared by the method of claim 1, to form a plate-shaped synthetic quartz glass member in which no striae are observable by optical inspection.

3. The method of claim 2, wherein the synthetic quartz glass member has a striae visibility which corresponds to striae grade A of U.S. military specification MIL-G-174B.

4. The method of claim 1, wherein the silane compound or the siloxane compound is continuously fed at a rate of 2,000 to 6,000 g/hr in step (i).

5. The method of claim 1, wherein the back and forth movement of the target has a cycle time of 5 minutes or less.

6. The method of claim 1, wherein the target is rotated around an axis of the ingot along the ingot growth direction.

* * * * *